H. T. ANTHONY.

Improvement in Photographic Plate-Holders.

No. 131,837. Patented Oct. 1, 1872.

UNITED STATES PATENT OFFICE.

HENRY T. ANTHONY, OF NEW YORK, N. Y., ASSIGNOR TO E. AND H. T. ANTHONY & CO., OF SAME PLACE.

IMPROVEMENT IN PHOTOGRAPHIC-PLATE HOLDERS.

Specification forming part of Letters Patent No. 131,837, dated October 1, 1872.

*To all whom it may concern:*

Be it known that I, HENRY T. ANTHONY, of the city and State of New York, have invented an Improvement in Photographic-Plate Holders, of which the following is a specification:

Plate-holders have been made with corner-pieces of glass and other material, and into these corner-pieces the angles of the glass or other plate have been placed in introducing the plate and frame into the camera. Corners have been made double, so that the plate could be placed either horizontally or vertically. It frequently happens that the plate is not of the exact size to fit the frame, or that the plate requires to be placed slightly angularly to the frame to better suit the picture to be taken. In the plate-holders before made there is not any provision for either of these contingencies.

My improvement consists in a corner for photographic-plate holding frames, made with a rounding offset or ledge in the angle of the corner against which the corner of the plate rests, and with a flat surface for the plate itself to rest against, so that the plate is supported; but it is free to be positioned in the frame either horizontally, or vertically, or at an inclination.

Figure 2:
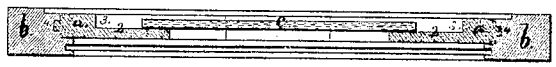
Figure 1:
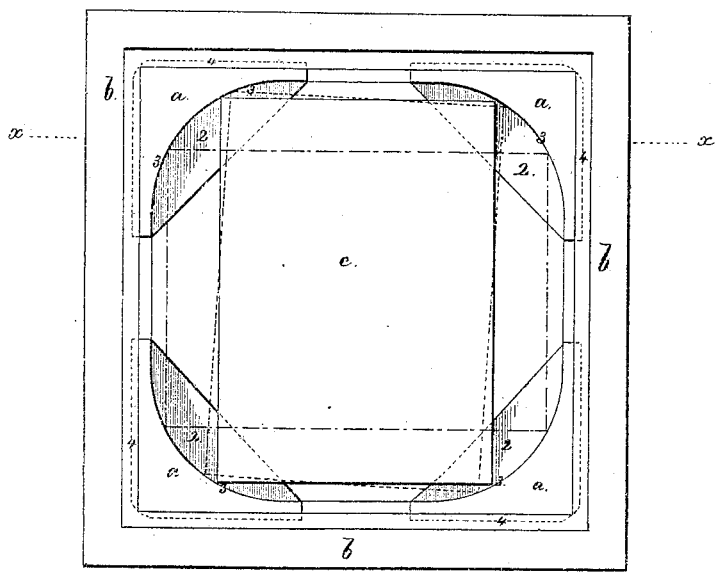

In the drawing, Figure 1 is a rear view of the frame and corners, and Fig. 2 is a section of the corners and frame at the line $x\ x$.

The corner $a$ is made with the flat surface 2, against which the face of the photographic plate rests, and with the rounding offset or ledge 3 for the corners of the plate to rest upon. The corners $a$ may be of glass or other material in one or more pieces, and the same are secured into the angles of the frame $b$ by the ribs 4 entering grooves in the frame, or by any other suitable means. The plate $c$ is represented in different positions by full and dotted lines, so as to illustrate the ways in which these rounding corners allow for the plate to be introduced. A square plate can be inserted, which cannot be introduced in the ordinary frame; and if the plate is too large it can be inserted after cutting or breaking off the corners thereof.

I claim as my invention—

The corner for photographic frames, made with the flat portion 2, to receive the surface of the plate and the rounding offset or ledge 3, as and for the purposes set forth.

Signed by me this 10th day of September, 1872.

HENRY T. ANTHONY.

Witnesses:
 HAROLD SERRELL,
 CHAS. H. SMITH.